Oct. 22, 1935.  A. J. KERR  2,018,527
COLLAPSIBLE PUSH CART
Filed Aug. 28, 1933
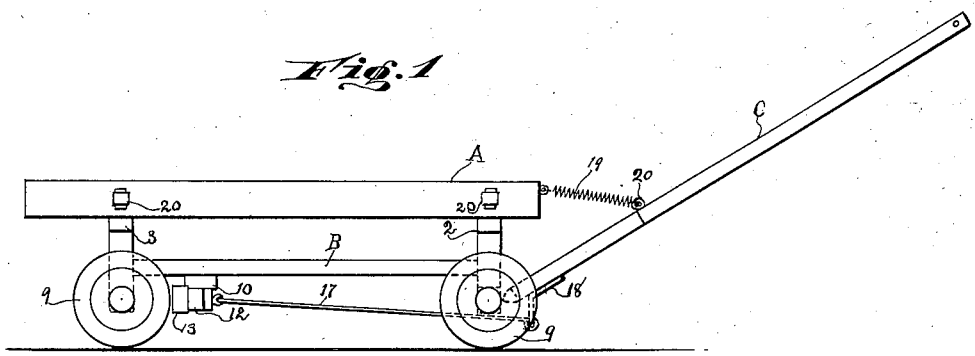
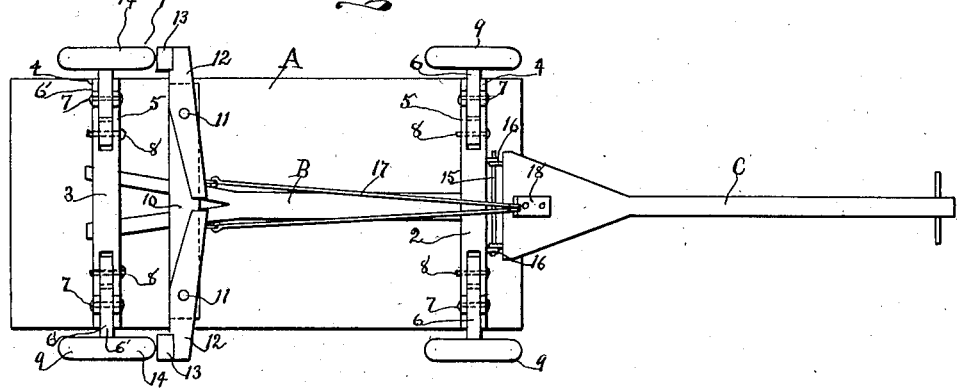
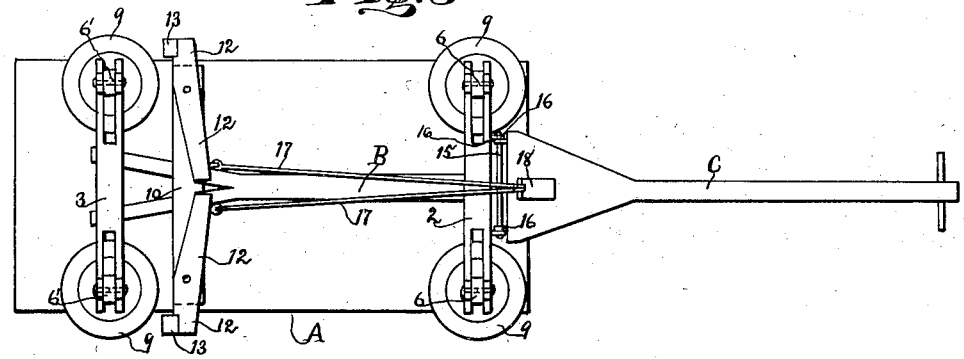
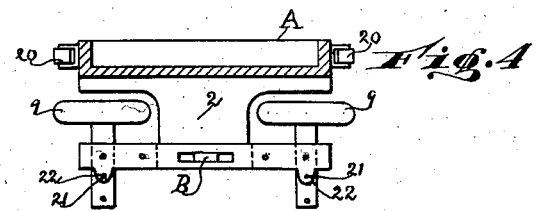
INVENTOR
ATTORNEY Patented Oct. 22, 1935

2,018,527

UNITED STATES PATENT OFFICE 2,018,527

COLLAPSIBLE PUSH CART

Alice J. Kerr, Cincinnatus, N. Y.

Application August 28, 1933, Serial No. 687,153

3 Claims. (Cl. 280—39)

My invention has reference to push carts to be used for carrying milk bottles along the street by hand, and other purposes as the bottles are delivered to the carts from trucks holding a large number of bottles as they pass along the city street, and used in conveying the milk to city customers under the statute law in New York State, as recently enacted.

The object of my device is to provide a small conveyor, in which a small number of bottles can be carried after delivery to it from the truck or trailer by the employee, who can move the cart from door to door in a given area, and also to provide a push cart so constructed that when emptied of its contents the cart can be turned in a sideways position and collapsed or folded and thus nested with other carts in small space.

With these objects in view my device consists in the following novel features of construction and arrangement of parts, as are hereinafter described and pointed out in the claims, reference being had to the accompanying drawing, in which:—

Fig. 1 is a perspective side view of my device.

Fig. 2 is a bottom plan view of my device.

Fig. 3 is a bottom plan view shown with folded wheels.

Figure 4 is a transverse view partly in section showing the wheels folded.

The same reference characters denote like parts in each of the several figures of the drawing.

In carrying out my invention, I provide a cart body A, on the under side of which is mounted a front cross sill 2 and rear cross sill 3 and, as a further part of my device I have the said cross sills 2 and 3 provided with recessed open end portions 4. This form of sill 2 and 3 also has the slotted axle portions 5, in which slotted recesses are mounted the movable axle members 6 and 6', which axle members are pivoted in the slotted portions by the sliding pins 7 and through which axles are slidably, removably mounted the sliding locking pins 8. On the axle supports 6, 6' are mounted the wheel members 9. Also mounted on the rear axle support sill is the reach member B extending from the rear axle 3 to the front axle support or sill 2 and connected in any convenient manner.

As a further part of my device I have mounted on the reach the cross bar 10, and on each end portion of the cross bar I pivotally mount by the pivots 11, the brake bars 12, on the outer end of which are positioned the brake shoes 13, to contact with the wheel rims 14 of the rear wheels 9.

As a further part of my device, I have pivotally mounted on the front side of the front axle supports 8, the turning support bar 15, on which is pivotally mounted the ring eyes 16, through which passes the support bar 15. The ring eyes 16 are mounted in the rear end of the tongue C, of the structure, and attached to the inner end of the brake bars 12, I have the rods 17, which extend outward with the outer ends pivotally connecting with plate 18 on the rear under side of tongue C as shown in Fig. 2.

As a further part of my device, mounted on the front end of box A and connecting therewith I have the coil spring 19, its outer end coupled with the ring 20 in the upper side surface of the tongue C as shown in Fig. 1. In the operation of my device having unloaded the milk bottles or containers from box A, among customers, I proceed to collapse the container and place it in a collapsed form for storage purposes, in a small space. When in stopping along the walk or street I release the outer end of the tongue C from the hand of the operator or employee the contraction of the coil spring 19, draws upon and raises the tongue handle C which in turn pulls outward on the connecting rods 17, 17, which in turn draw open the pivoted brake bars 12, and presses inward the brake shoes 13, against the wheel peripheries. The conveyance is thus braked. The pins 7 form pivots for the axle members 6, 6 which may in turn be moved to a vertical position with the wheels 9, 9, in a horizontal position in the recesses 4 as shown in Figs. 3 and 4, with the wheel peripheries 14 projecting outward beyond the alinement of the outer side of the box A. On the surface of box A I have mounted rollers or other rotating elements or surfaces 20 on either side, and in the folded position of the wheels, the wheel peripheries 14, are in exact alinement with the surface of rollers 20 on either side of box A, thus permitting a level rolling surface with double lines of tracking in contact with the floor or ground, so that when the cart is turned on its side, a double supporting rolling surface is presented to aid in moving the same no matter which side is in vertical position for rolling, the structure in the small space may be placed on its edge for moving purposes. In this manner a large number of delivery carts can be nested by being stored in small compact space. In this manner also, a large number of delivery carts are always at hand for ready use. In construction the applicant elects to reserve the right to modify the rotating side supports in any manner or form desired to be used in combination with or without the wheel surface for rotation movement in storage or movement of the carts when not in use for storage purpose, without departing from the spirit of the invention.

As clearly shown in Fig. 4, the slotted axle members may be provided with ears 21 having openings 22 through which the movable pins 8 may be inserted to permit them to pass through a registering opening in the movable axle sections 6 to lock said axle sections in vertical collapsed position.

Having thus described my invention, what I claim as new, and for which I desire to be protected by Letters Patent are as follows:

1. In a push cart for milk bottle delivery and adapted for stacking when not in use, the combination of a body, slotted axle supports carried by the body, movable axle members positioned in the slotted recesses of the axle supports and adapted to be normally horizontal when in operable position, pivoted means for the movable axle members permitting the axle members to be moved into a vertical position beneath the body, wheels mounted on the free ends of the movable axle members and adapted to assume a horizontal position beneath the body when the movable axle members are moved into vertical position, and roller elements carried by the body and so disposed as to have their outer surfaces in vertical alignment with the peripheries of the wheels when said wheels are folded into horizontal position.

2. In a push cart for milk bottles and the like adapted to be folded into small compass for stacking purposes, the combination of a shallow body portion, axle supports extending across the bottom of the body portion, stub axles pivotally mounted on the axle supports and constructed and arranged to be folded upwardly to a position between the axle supports and the bottom of the body portion, wheels rotatably mounted on the stub axles, rotatable members on the sides of the body portion, said rotatable members and the wheels on the axles being so designed as to have their peripheries in alignment when the stub axles are folded upwardly, said wheels and said rotatable elements forming rotary supports for said body portion when the body portion is turned over on its side.

3. In a push cart and the like adapted to be stacked when not in use, the combination of a body portion having on its sides a plurality of rotatable elements and having axle supports across its bottom, said axle supports having recesses in the ends thereof, in each of which recesses is pivotally mounted an axle section having a wheel mounted on the outer end thereof and means for permitting pivotally turning said axle section with wheel mounted thereon into a horizontal position so as to bring the outer surface of the folded wheels in alignment with the rotatable elements to permit the cart to be supported and moved on its side, on the wheels and rotatable elements.

ALICE J. KERR.